United States Patent
Eck et al.

(10) Patent No.: US 10,357,740 B2
(45) Date of Patent: Jul. 23, 2019

(54) LIQUID REDISTRIBUTOR

(71) Applicant: L'Air Liquide, Societe Anonyme pour l'Etude et l'Exploitation des Procedes Georges Claude, Paris (FR)

(72) Inventors: Thomas Eck, Mannheim (DE); Klaus Kirsten, Mainz (DE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 245 days.

(21) Appl. No.: 14/903,851

(22) PCT Filed: Jul. 7, 2014

(86) PCT No.: PCT/EP2014/064465
§ 371 (c)(1),
(2) Date: Jan. 8, 2016

(87) PCT Pub. No.: WO2015/004064
PCT Pub. Date: Jan. 15, 2015

(65) Prior Publication Data
US 2016/0151736 A1     Jun. 2, 2016

(30) Foreign Application Priority Data
Jul. 11, 2013   (DE) ................. 10 2013 107 357

(51) Int. Cl.
*B01D 53/18*   (2006.01)
*B01D 3/00*   (2006.01)
(Continued)

(52) U.S. Cl.
CPC ........... *B01D 53/185* (2013.01); *B01D 3/008* (2013.01); *B01D 53/1487* (2013.01); *B01J 19/32* (2013.01)

(58) Field of Classification Search
CPC .. B01D 53/185; B01D 53/1487; B01D 3/008; B01J 19/32
See application file for complete search history.

(56) References Cited

U.S. PATENT DOCUMENTS 6,293,528 B1 * 9/2001 Monkelbaan .......... B01D 3/008
    261/108
6,891,061 B1 * 5/2005 Nishimura ............. B01D 3/324
    560/218

(Continued)

FOREIGN PATENT DOCUMENTS

DE    690 18 408 T2    9/1995
DE    101 05 660 A1    8/2002
(Continued)

OTHER PUBLICATIONS

International Search Report and Written Opinion for PCT/EP2014/064465, dated Sep. 30, 2014.

*Primary Examiner* — Stephen Hobson
(74) *Attorney, Agent, or Firm* — Justin K. Murray

(57) ABSTRACT

A liquid redistributor, arranged in a packing column between two packings, wherein in the column a liquid phase is guided from top to bottom and against the same a gas phase from bottom to top, comprising a liquid distributor tray and a droplet damping tray, which attenuates the fluidization of the liquid layer on the liquid distributor tray as caused by the droplets falling down.

9 Claims, 3 Drawing Sheets

A - A

(51) Int. Cl.
*B01D 53/14* (2006.01)
*B01J 19/32* (2006.01)

(56) References Cited

U.S. PATENT DOCUMENTS

| | | | | |
|---|---|---|---|---|
| 8,858,686 | B2* | 10/2014 | Polderman | B01D 3/20 95/219 |
| 2003/0090009 | A1* | 5/2003 | Zich | B01D 3/008 261/97 |
| 2016/0175733 | A1* | 6/2016 | Haroun | B01D 3/008 261/113 |
| 2016/0206970 | A1* | 7/2016 | Alzner | B01D 3/008 |
| 2016/0332090 | A1* | 11/2016 | Johannesen | B01D 3/008 |
| 2018/0318727 | A1* | 11/2018 | Perdu | B01D 3/008 |

FOREIGN PATENT DOCUMENTS

| | | | |
|---|---|---|---|
| EP | 0 520 097 | 12/1992 | |
| EP | 1 378 281 | 1/2004 | |
| FR | 2 936 717 A1 | 4/2010 | |
| GB | 1160260 A * | 8/1969 | B01D 3/008 |
| WO | WO-2012134470 A1 * | 10/2012 | B01D 3/008 |
| WO | WO2015044064 A1 | 1/2015 | |

* cited by examiner

LIQUID REDISTRIBUTOR

CROSS REFERENCE TO RELATED APPLICATIONS

This application is a § 371 of International PCT Application PCT/EP2014/064465, filed Jul. 7, 2014, which claims the benefit of DE 10 2013 107 357.3, filed Jul. 11, 2013, both of which are herein incorporated by reference in their entireties.

FIELD OF THE INVENTION

Embodiments of the invention relate to a liquid redistributor, arranged in a packing column, comprising a liquid distributor tray; furthermore, embodiments of the invention relate to packing columns which are equipped with at least one liquid redistributor. The term packing column here also comprises those columns, which e.g., are designed as packing columns only in their lower part, while their upper part is designed, e.g., as tray column. Furthermore, embodiments of the invention relate to a method for the extraction of 1,3-butadiene from a gaseous $C_4$ hydrocarbon mixture, in which such packing columns are used.

BACKGROUND

To achieve a high separation efficiency of a packing column which is used in a thermal separation process, it is required to uniformly distribute the liquid phase over the column cross-section. When the liquid trickles through the packing, independent of whether the same consists of a random packed bed or whether it is a stacked or structured packing, an unequal distribution of the liquid occurs, which increases with the packing height trickled through. It therefore is required to limit the height of a packing and collect the liquid after passing through a packing and newly distribute the liquid over the next following packing.

The liquid dripping out of a packing can be collected by a column tray designed as liquid collector and can be passed from there into a column tray designed as liquid redistributor, cf. M. Baerns et al., Technische Chemie, 2006 WILEY-VCH Verlag GmbH & Co. KGaA, Weinheim, p. 334, Fig. 9.51.

SUMMARY OF THE INVENTION

Depending on the application, it is also possible, however, to refrain from using a liquid collector and carry out the collection and redistribution of the liquid with the same column tray. Embodiments of the invention relate to such column tray designed as liquid redistributor.

Such column tray may include a liquid distributor tray which is equipped with numerous openings distributed over its surface, wherein these openings are formed such that a liquid layer is formed on the tray, out of which the uniformly distributed liquid drips down onto the next following packing. The thickness of this liquid layer in most cases is 20 to 400 mm. It chiefly is dependent on the actual load of the column and on the size and number of the openings in the tray.

In many cases, the liquid distributor tray is designed as perforated plate or channel distributor.

To prevent that the dripping down of the liquid through the openings in the distributor tray is impeded by the gas phase rising in the column, either the distributor tray is designed with a smaller diameter than the column inside diameter, so that the gas phase can rise at the column inner wall, or gas chimneys are inserted into the distributor tray. The same serve for leading the gas through the distributor tray and the liquid layer formed on the distributor tray. The chimneys can be formed for example cylindrical or rectangular. They reach through the liquid layer and generally are closed at the top, so that no liquid from the overlying packing drips into or through the same. For this reason, the gas chimneys are provided with lateral openings for the gas exit, wherein these openings are located with a safety distance above the liquid layer to be formed on the distributor tray. In many cases, the gas chimneys have a total height of up to 500 mm. Above the gas chimneys, up to the bottom side of the overlying packing, a free height of at least 800 mm generally is maintained, in order to enable the access for assembly, maintenance and cleaning tasks. From a height of more than 1 m, the liquid droplets therefore fall from the bottom side of the packing lying above the distributor tray into the liquid layer formed on the distributor tray. Due to the kinetic energy of the droplets resulting from the height of fall, the liquid layer is greatly perturbed or fluidized at least on its surface. This fluidization can result in the formation of foam on the liquid layer, whereby the flux of the process media through the column and hence the operability of the column is impaired. Furthermore, the whirling up of the liquid leads to the fact that gas already dissolved from the same is expelled again, which likewise leads to the formation of foam.

Therefore, it is the object of the invention to provide a liquid redistributor which avoids these disadvantages, in particular an excessive formation of foam inside the column.

The object is solved by a liquid redistributor according to the embodiments disclosed herein.

The free distance between the liquid distributor tray and the droplet damping tray should be so large that a liquid layer can form on the distributor tray, which covers the tray in a uniform layer thickness, so that the liquid can uniformly be distributed over the column cross-section. However, the distance should not be larger than is required for the secure formation of this liquid layer, so that the height of fall of the droplets exiting from the droplet damping tray into the liquid layer is as small as possible. With reference to these specifications, the skilled person will be able to determine suitable distances, for example by routine experiments.

Alternatively, the droplet damping tray also can rest directly on the liquid distributor tray, wherein the liquid layer present on the distributor tray is formed within the droplet damping tray. In this way, a particularly compact design of the column is achieved.

In accordance with the present invention, gas phase also is understood to be a vapor phase in equilibrium with the corresponding liquid phase.

A particularly suitable aspect of the invention is characterized in that the droplet damping tray is formed by a random packed bed arranged between a supporting grid and a hold-down grid or by a stacked packing. This aspect has the advantage that the tray is constructed in the same or a similar way as the packings used in the column. In general, the suitability of the packing material for the respective process media hence is known, so that no unnecessary process risks are caused by the material selection. In addition, stock-keeping of the packing material therefore is less expensive.

A further aspect of the invention is characterized in that the void volume of the bed or packing is at least 50 vol-%. With a large void volume, the passage of the liquid through the droplet damping tray still is possible even with an advanced soiling of the tray, and the shut-down periods of the column for cleaning purposes thus are reduced.

A further preferred aspect of the invention is characterized in that the layer height of the bed or packing of the droplet damping tray lies between 10 and 800 mm. This layer height is dependent on the properties of the process media, the packing structure or the packing material, the column geometry and load. It should be chosen such that the liquid passes through the layer with sufficient speed, so that there is no impoundment of the liquid and no formation of a liquid layer on the upper side of the droplet damping tray.

A further preferred aspect of the invention is characterized in that the distance between the liquid distributor tray and the droplet damping tray lies between 0 and 500 mm. To avoid any height of fall of the droplets, the droplet damping tray accordingly can be placed directly on the liquid distributor tray. In general, however, it is expedient to maintain a free distance for the formation of a liquid surface on the distributor tray.

A further preferred aspect of the invention is characterized in that the gas phase rising in the column is guided vertically through at least one, in general mostly a plurality of gas chimneys through the liquid distributor tray and the droplet damping tray. The liquid distributor tray thereby can be extended up to the column inner wall. Due to this design, liquid streams running along the column edge or in the edge region of the column cross-section also can be seized by the liquid redistributor.

Furthermore, the invention also comprises packing columns or columns which partly are designed as packing columns, in case they are equipped with at least one liquid redistributor according to the invention.

Furthermore, the invention also comprises the use of a packing column according to the invention for carrying out a thermal separation process, selected from distillation, rectification, extractive distillation and absorption.

Furthermore, the invention also comprises a method for the extraction of 1,3-butadiene from a gaseous $C_4$ hydrocarbon mixture by using a liquid mixture of N-methylpyrrolidone (NMP) and up to 15 wt-% of water as selective solvent, wherein the extraction is carried out by means of a packing column according to the invention. The 1,3-butadiene, which is contained in the gaseous $C_4$ hydrocarbon mixture with an amount of approximately 40 wt-%, is almost completely absorbed by the solvent. The gaseous $C_4$ hydrocarbon mixture leaves the packing column as top product or refined product with a 1,3-butadiene content of, generally, below 0.2 wt-%.

When carrying out this method, without use of the droplet damping trays according to the invention, gamma scanning of the column provided indications that a formation of foam might have occurred on the liquid distributor trays. When using the trays according to the invention, the quantity ratio solvent/$C_4$ hydrocarbon mixture could be reduced by approximately 10% with the product quality remaining constant, whereby the formation of foam could be reduced and the throughput of the column thus could likewise be increased by this percentage.

BRIEF DESCRIPTION OF THE DRAWINGS

Further developments, advantages and possible applications of the invention can also be taken from the following description and the drawing. All features described and/or illustrated form the subject-matter of the invention per se or in any combination, independent of their inclusion in the claims or their back-reference.

DETAILED DESCRIPTION OF THE INVENTION

Figure 1:
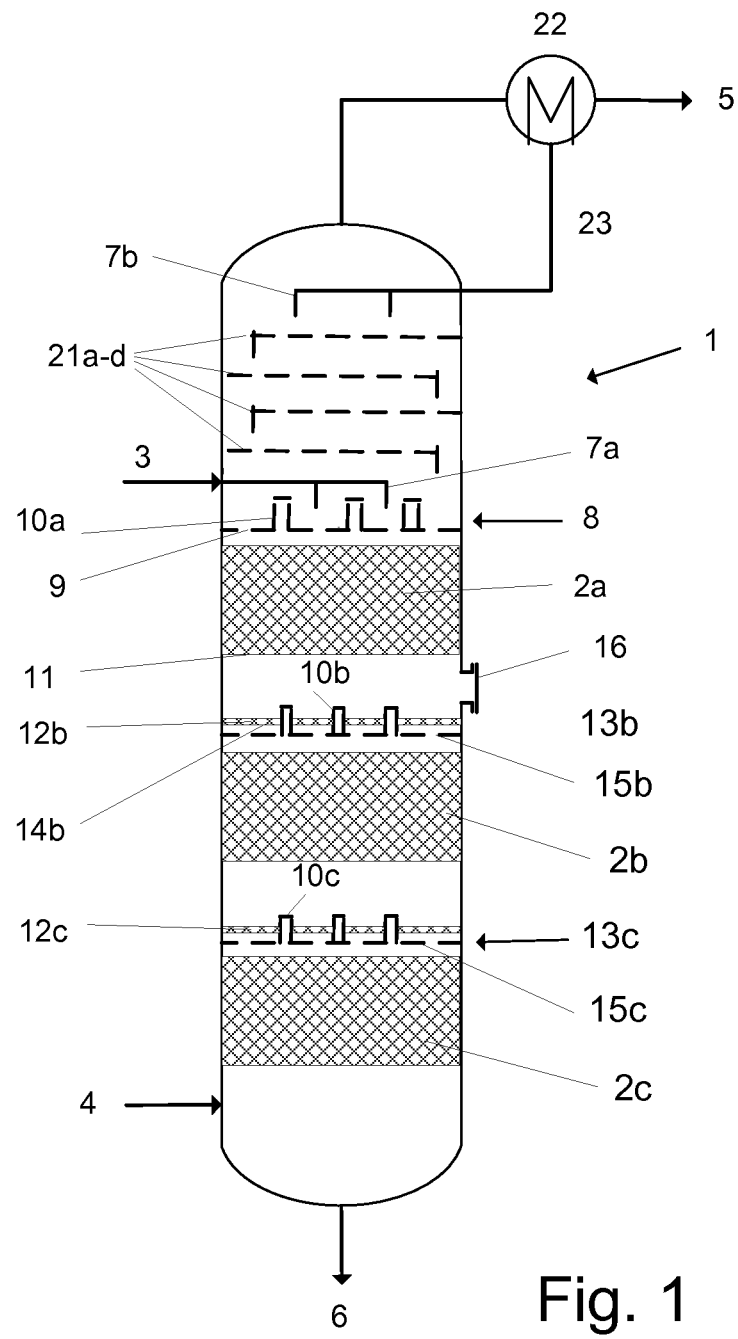
FIG. 1 shows the longitudinal section of a column equipped with liquid redistributors according to the invention for separating 1,3-butadiene from a $C_4$ cut.

In FIG. 1, the column 1 in the lower part is designed as packing column with three packings 2 a, b and c, and in the upper part as tray column with four wash trays 21 a-d and a reflux condenser 22. The number of the packings and trays here is chosen by way of example, and it does not necessarily correspond to the number used in practice. Via conduit 3 the solvent as liquid phase and via conduit 4 the gaseous $C_4$-hydrocarbon mixture as gas phase is introduced into the column. Via conduit 5 the refined product, i.e. the $C_4$-hydrocarbon mixture liberated from 1,3-butadiene, and via conduit 6 the liquid product stream, i.e. the solvent loaded with 1,3-butadiene, is discharged from the column.

Via a feed system 7a, the solvent 3 is distributed on the liquid distributor 8 as uniformly as possible over the cross-section of the column 1. In the example shown here, the liquid distributor comprises a perforated plate 9 and gas chimneys 10a. In this example, it is not equipped with a droplet damping tray. It can be omitted at this point, when either the feed system 7a is designed such that it gently distributes the liquid phase on the perforated plate 9 without a strong impulse, or when the added liquid phase, before loading with the gas phase, does not tend to foaming. The liquid phase drips from the perforated plate 9 onto the packing 2a, seeps through the packing and again drips out from the bottom side 11 of the packing 2a. The droplets impinge on the droplet damping tray 12b of the liquid redistributor 13b. The liquid seeps through the droplet damping tray 12b and drips out on its bottom side 14b onto the liquid distributor tray 15b of the liquid redistributor 13b.

The gas phase rises through the packings 2a, 2b and 2c in the column. By means of the liquid distributor 8 and the liquid redistributors 13b and 13c it is guided through the gas chimneys 10a, 10b and 10c. In the upper part of the column equipped with wash trays, solvent passed over into the gas phase is washed out with the reflux 23 produced in the condenser 22.

Through the manhole 16 the access to maintenance and cleaning works in the interior of the column becomes possible.

Figure 2:
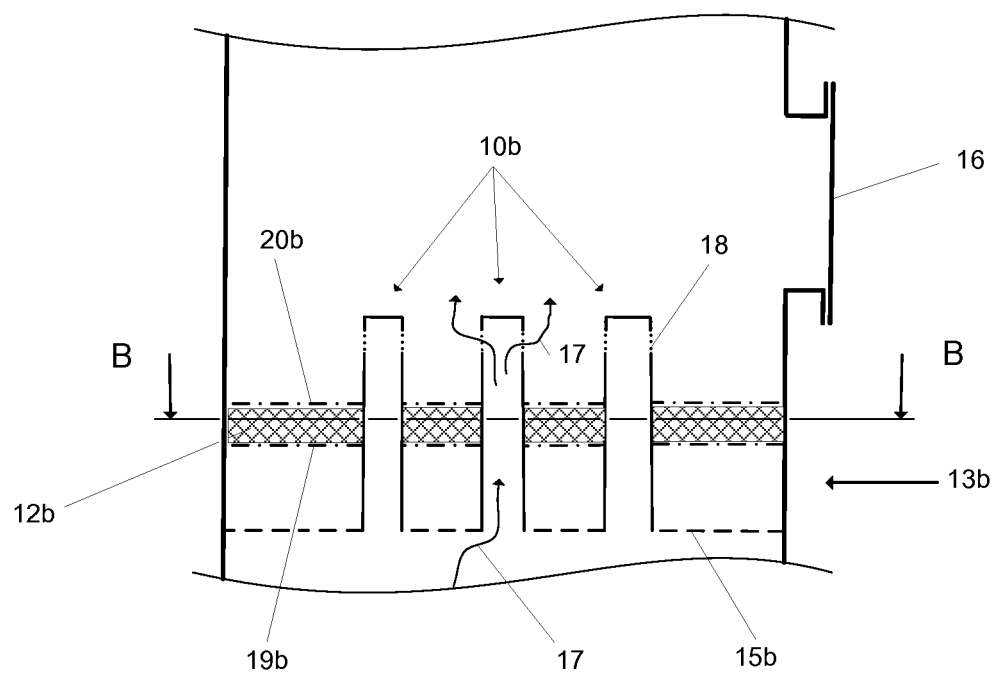
FIG. 2 shows the longitudinal section of a liquid redistributor according to the invention, which is mounted in a packing column.

FIG. 2 shows a section of FIG. 1, in order to represent the liquid redistributor 13b in more detail. There are shown the lateral openings 18 of the gas chimneys 10b and the flux of the gas phase 17 through the chimneys. There are also shown the supporting grid 19b and the hold-down grid 20b of the droplet damping tray 12b.

Figure 3:
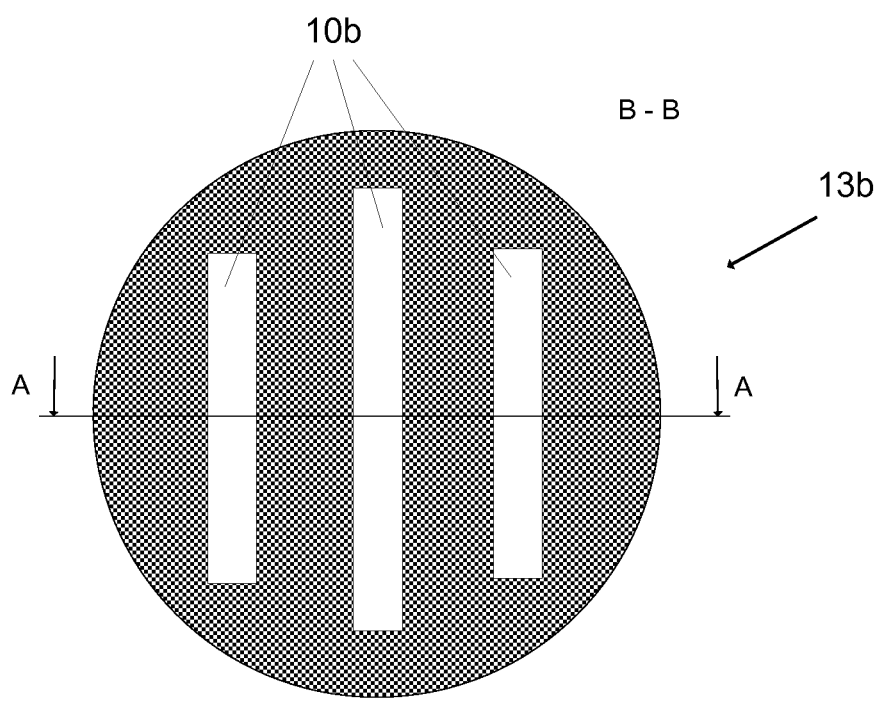
FIG. 3 shows the cross-section of a liquid redistributor according to the invention.

FIG. 3 shows the rectangular shape of the gas chimneys 10b used in this example and also frequently used in practice.

INDUSTRIAL APPLICABILITY

The invention provides a measure to be realized in a technically simple and inexpensive way, in order to increase the production capacity of a packing column which is used for the treatment of media tending to foaming.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS 1 column
2 a, b, c packings
3 inflow of liquid phase, solvent
4 inflow of gaseous phase, $C_4$-hydrocarbon mixture
5 outflow of refined product
6 outflow of liquid product
7 feed system
8 liquid redistributor
9 perforated plate
10 a, b, c gas chimney
11 bottom side of the packing
12 a, b, c droplet damping tray
13 b, c liquid redistributor
14 b bottom side of droplet damping tray
15 b, c liquid distributor tray
16 manhole
17 flow of the gas phase
18 opening in the gas chimney for the gas phase
19 b supporting grid
20 b hold-down grid
21 a-d wash trays
22 reflux condenser
23 reflux

The invention claimed is:

1. A liquid redistributor, configured for use in a packing column for a thermal separation process between two packings, wherein in the column a liquid phase is guided from top to bottom and against the same a gas phase is guided from bottom to top, the liquid redistributor comprising:
a liquid distributor tray;
a droplet damping tray which is arranged above the liquid distributor tray and is aligned parallel to the same,
wherein the droplet damping tray covers the column cross-section to the same extent as the liquid distributor tray and wherein the droplet damping tray is configured such that on an upper side of the droplet damping tray no liquid layer is formed by the liquid dripping down from the packing disposed above and that, driven by gravity, the liquid moves through the droplet damping tray and again exits from a bottom side of the droplet damping tray,
wherein the droplet damping tray comprises a random packed bed or stacked packing arranged between a supporting grid and a hold-down grid,
wherein the liquid distributor tray comprises at least one gas chimney for the flux of the gas phase through the liquid distributor tray and the droplet damping tray,
wherein the droplet damping tray is disposed below an upper point of the at least one gas chimney.

2. The liquid redistributor according to claim 1, wherein the void volume of the random packed bed or the stacked packing is at least 50 vol-%.

3. The liquid redistributor according to claim 1, wherein a layer height of the random packed bed or the stacked packing lies between 10 and 800 mm.

4. The liquid redistributor according to claim 1, wherein the distance between the liquid distributor tray and the droplet damping tray lies between 0 and 500 mm.

5. The liquid redistributor according to claim 1, wherein the droplet damping tray is disposed below one of the two packings.

6. The liquid redistributor according to claim 1, wherein the droplet damping tray is located below a point where the flux of the gas phase exits the at least one gas chimney, such that no flux of the gas phase is directed upwards into the droplet damping tray.

7. A packing column for carrying out a thermal separation process, wherein the packing column comprises at least one liquid redistributor according to claim 1.

8. A method for carrying out a thermal separation process using a packing column as claimed in claim 7, wherein the thermal separation process is selected from the group consisting of distillation, rectification, extractive distillation, and absorption.

9. The method as claimed in claim 8, wherein the thermal separation process is absorption, wherein the absorption comprises a method for the absorption of 1,3-butadiene from a $C_4$ hydrocarbon mixture by a liquid mixture of N-methylpyrrolidone and up to 15 wt-% of water as selective solvent, wherein the packing column is equipped with a reflux and in a lower part of the packing column is designed as packing column and in its upper part as tray column, wherein below the packings a gas phase consisting of the $C_4$-hydrocarbon mixture, and directly above the packings a liquid phase consisting of the solvent is introduced into the column, wherein the gas phase rises in the column and the 1,3-butadiene contained therein is absorbed by the liquid phase flowing down through the packings and wherein the gas phase is loaded with solvent, wherein the solvent in the upper part of the column equipped with trays is washed out from the gas phase by the reflux, wherein as top product a C₄ hydrocarbon mixture containing only traces of 1,3-butadiene and as bottom product the solvent loaded with 1,3-butadiene is obtained, wherein the packing column further comprises the liquid redistributor according to claim 1.

\* \* \* \* \*